(12) United States Patent
Donohue

(10) Patent No.: US 8,851,784 B2
(45) Date of Patent: Oct. 7, 2014

(54) SYSTEM OF AN EXTENSION POLE

(76) Inventor: James K. Donohue, Lakeway, TX (US)

( * ) Notice: Subject to any disclaimer, the term of this patent is extended or adjusted under 35 U.S.C. 154(b) by 699 days.

(21) Appl. No.: 12/969,799

(22) Filed: Dec. 16, 2010

(65) Prior Publication Data

US 2012/0155950 A1 Jun. 21, 2012

(51) Int. Cl.
*F16B 7/10* (2006.01)
*F16B 7/14* (2006.01)
*B25G 1/04* (2006.01)

(52) U.S. Cl.
CPC ............... *B25G 1/04* (2013.01); *F16B 7/1427* (2013.01)
USPC ..................... 403/109.5; 403/109.1

(58) Field of Classification Search
CPC .................................... F16B 7/1427
USPC ........................... 403/109.1, 109.5
See application file for complete search history.

(56) References Cited

U.S. PATENT DOCUMENTS

| | | | |
|---|---|---|---|
| 1,983,728 A | | 9/1933 | Bafetti |
| 4,154,545 A | * | 5/1979 | Pinto et al. .................. 403/109.5 |
| 4,419,026 A | | 12/1983 | Leto |
| 4,585,367 A | * | 4/1986 | Gall ............................... 403/104 |
| 4,733,681 A | * | 3/1988 | Lee ................................ 403/104 |
| 4,856,929 A | | 8/1989 | Smahlik |
| 5,649,780 A | * | 7/1997 | Schall ......................... 403/109.5 |
| 5,876,147 A | | 3/1999 | Longo |
| 6,142,698 A | * | 11/2000 | Nutter ......................... 403/109.1 |
| D538,133 S | | 3/2007 | Richardson |
| 7,637,684 B2 | * | 12/2009 | Tims et al. .................. 403/109.5 |
| 2009/0008213 A1 | * | 1/2009 | Tims et al. .................. 403/109.5 |

* cited by examiner

*Primary Examiner* — Victor MacArthur
(74) *Attorney, Agent, or Firm* — Mark E. Scott; Conley Rose, P.C.

(57) ABSTRACT

An extension pole. At least some of the illustrative embodiments include a first tubular member telescoped within a second tubular member. A first locking system is disposed within the internal volume of the first tubular member, and a second locking system is disposed at least partially on an outside diameter of the second tubular member.

16 Claims, 7 Drawing Sheets

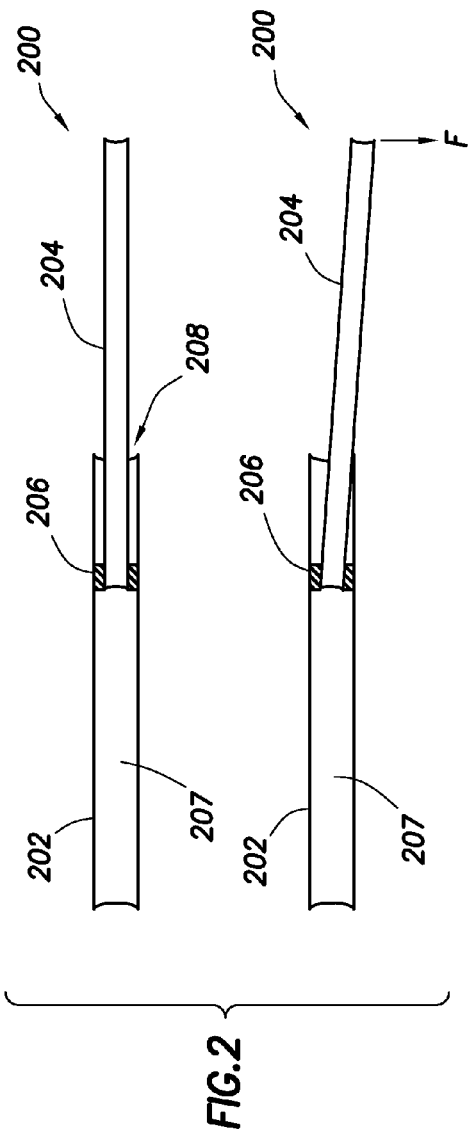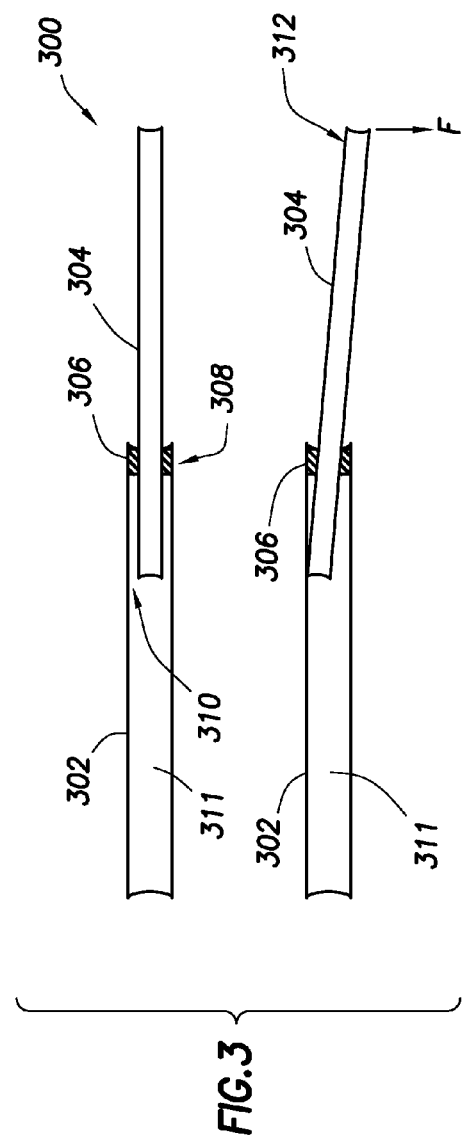

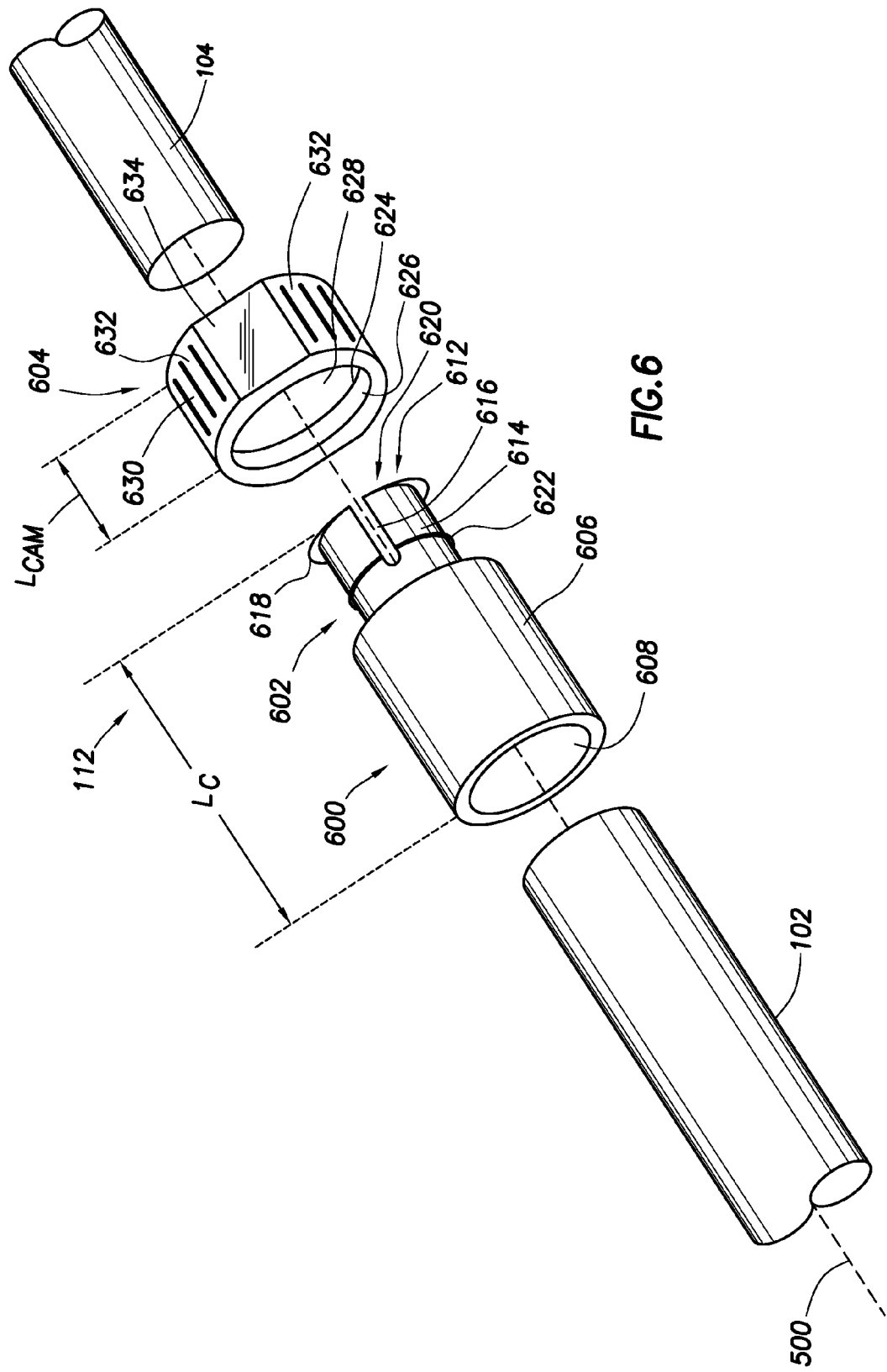

US 8,851,784 B2

SYSTEM OF AN EXTENSION POLE

BACKGROUND

In the realm of outdoor projects, particularly outdoor home maintenance, many of the tasks that need to be performed are well above ground level. For example, tree branches may need to be trimmed, rain gutters cleaned, soffits may need to be brushed (such as to remove spider webs or wasps nests), and the like.

Many manufacturers mount tools on the end of extendible poles. For tasks to be performed three to two five feet above the users head, deflection of the pole is rarely an issue. By contrast, when an extension pole extends 15 feet or more, the amount of deflection experienced by the pole may adversely affect the ability to perform the desired task. For example, in the illustrative case of a tree limb saw where the cutting motion is implemented as the saw is being pulled toward the user, an extension pole that deflects significantly may make it difficult to push the saw away from the user such that the cutting motion can be repeated.

Moreover, in many situations the length of the extension pole may need to be adjusted in situations when the pole is in a substantially vertical orientation. In the related art, when the pole locking mechanism is released with the pole in a substantially vertical orientation, gravity tends to retract the pole and thus some locking systems cannot be easily used in use orientations.

Thus, any advance which helps reduce deflection of an extension pole and/or which aids the user in changing the length of the extension pole would provide a competitive advantage in the market place.

BRIEF DESCRIPTION OF THE DRAWINGS

For a detailed description of exemplary embodiments, reference will now be made to the accompanying drawings in which:

FIG. 2 shows a cross-sectional view of a utility pole;

FIG. 3 shows a cross-sectional view of a utility pole;

FIG. 6 shows an exploded perspective view of an external connector in accordance with at least some embodiments;

NOTATION AND NOMENCLATURE

Certain terms are used throughout the following description and claims to refer to particular system components. As one skilled in the art will appreciate, different companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Hold" with respect to axial orientation of two devices shall mean that a particular axial orientation of the two devices is held constant over expected operational use (e.g., sawing, raking, prodding, brushing, painting). The fact that a system that holds is not infallible (i.e., axial orientation could change if a force well above force applied in expected operational use) shall not obviate that the system holds the axial orientation.

"Ellipse" or "elliptical" shall include the geometric shape known as oval in spite of the slight mathematical differences between an ellipse and an oval. Moreover, status as an elliptical cross-sectional shape shall not be negated by the overall elliptical shape being created by a series of abutting planar surfaces.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to locking assemblies which hold telescoping utility poles in particular axial orientations. The utility pole may be used, for example, for performing useful tasks above the head of the user, such as tree trimming operations, painting operations, gutter cleaning operations, and the like.

Figure 1:
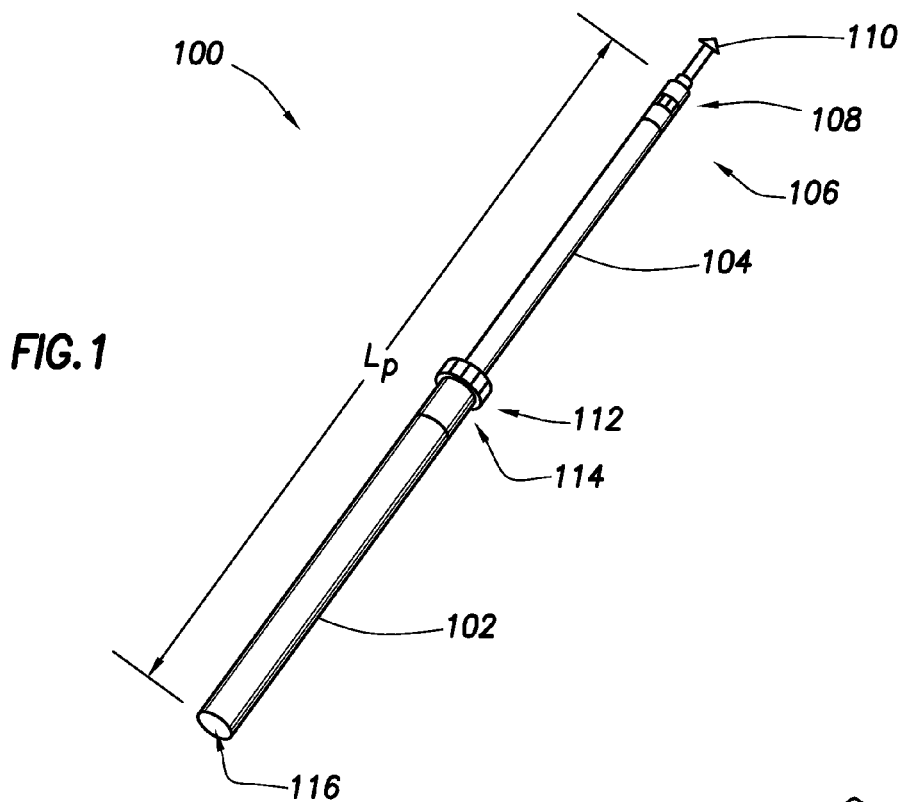
FIG. 1 shows a utility pole in accordance with at least some embodiments.

FIG. 1 shows a perspective view of a utility pole 100 in accordance with at least some embodiments. In particular, the utility pole 100 comprises a proximal pole portion 102 and a distal pole portion 104. In accordance with at least some embodiments, the distal pole portion 104 is telescopically engaged with the proximal pole portion 102 such that the overall length of the utility pole 100 (the length labeled $L_P$ in FIG. 1) may be adjustable. In a particular embodiment, at least a portion of the utility pole 100 is constructed of a non-conductive material, such as fiberglass or plastic. In some cases, the entire utility pole 100 is constructed of a non-conductive material. Combinations of conductive and non-conductive materials may be equivalently used.

The distal end 106 of the distal pole portion 104 further comprises a connector assembly 108. The connector assembly 108 in accordance with the various embodiments is designed and constructed such that an implement 110 can be quickly connected and disconnected from the utility pole 100. The implement 110 is illustratively shown as a sharpened spike, which may be used, for example, to test for wood rot on facie boards of homes. It is to be understood, however, that the implement 110 in the form of a sharpened spike is merely illustrative of any implement which may need to be attached to the distal end of the utility pole 100 (e.g., hooks, brooms, rakes and saws).

FIG. 1 also shows a locking system coupled on a distal end 114 of the proximal pole portion 102. Though not necessarily visible in the view of FIG. 1, the locking system 112 engages with the exterior surface of the distal pole portion 104 such that, in a locked orientation, the locking system 112 helps hold the axial relationship of the proximal pole portion 102 relative to the distal pole portion 104 (i.e., the relative telescopic relationship and therefore the length $L_P$). In accordance with the various embodiments, the utility pole 100 further comprises another locking system disposed within the internal volume 116 of the proximal pole portion 102, but such second locking system is not visible in FIG. 1. Before getting into specifics of the illustrative locking systems, the specification first turns to shortcomings of some related-art devices.

FIG. 2 shows two cross-sectional views of a utility pole 200. In particular, utility pole 200 comprises a proximal pole portion 202 and a distal pole portion 204 telescoped within the proximal pole portion 202. A locking system 206 resides between the proximal pole portion 202 and distal pole portion 204 within the internal volume 207 of the proximal pole portion 202. In order to enable the distal pole portion 204 to telescope in and out of the proximal pole portion 202, a certain amount of clearance 208 exists between the internal diameter of the proximal pole portion 202 and the outer diameter of the distal pole portion 204. However, as shown in the lower portion of FIG. 2, utility pole 200 with only a single locking system 206 may experience a certain amount of deflection caused by the interaction of the locking mechanism 206 and the clearance 208. In particular, when a force F is applied on the distal end 210 of the distal pole portion 204, the locking system 206 acts as a fulcrum that allows the distal pole portion 204 to rotate within the internal diameter of the proximal pole portion 202 by an amount equal to the clearance 208. While the clearance may be relatively small, the amount of travel allowed by the clearance is significantly amplified at the distal end 210 of the pole, as illustrated. It is noted that the clearances, as well as the deflection caused by the force, are exaggerated in FIG. 2 in order to explain how the clearance may result in deflection. Moreover, the illustrative cross-sectional views of FIG. 2 assume that the proximal pole portion 202 and distal pole portion 204 are completely rigid; however, in practice each of the proximal pole portion 202 and distal pole portion 204 may flex or bow under an applied force F, thus further amplifying the amount of deflection in the utility pole 200.

FIG. 3 illustrates a utility pole 300 also comprising a proximal pole portion 302 and a distal pole portion 304 telescoped within the proximal pole portion 302. In the illustrative case of FIG. 3, the locking system 306 resides at the distal end 308 of the proximal pole portion 302. In order to enable the distal pole portion 304 to telescope with respect to the proximal pole portion 302, a certain amount of clearance 310 exists between the internal diameter of the proximal pole portion 302 and the outside diameter of the distal pole portion 304 within the internal volume 311 defined by the proximal pole portion 302. Much like the case described in FIG. 2, an applied force F on the distal end 312 of the distal pole portion 304, as shown in the lower portion of FIG. 3, results in deflection of the distal pole portion 304 with the locking system 306 acting as a fulcrum and the portion of the distal pole portion 304 within the proximal pole portion 302 experiencing movement in the amount of the clearance 310. Here again, although the clearance 310 may be relatively small, the small amount of movement allowed by the clearance amplified over the distance that the distal pole portion 304 extends may be relatively large. Again, the clearances, as well as the deflection caused by force, are exaggerated in FIG. 3 in order to explain how the clearance may result in some deflection. Further, the proximal pole portion 302 and distal pole portion 304 of FIG. 3 are assumed to be completely rigid, but in practice the flexing or bowing of the pole portions 302 and 304 may further amplify the amount of deflection.

Figure 4:
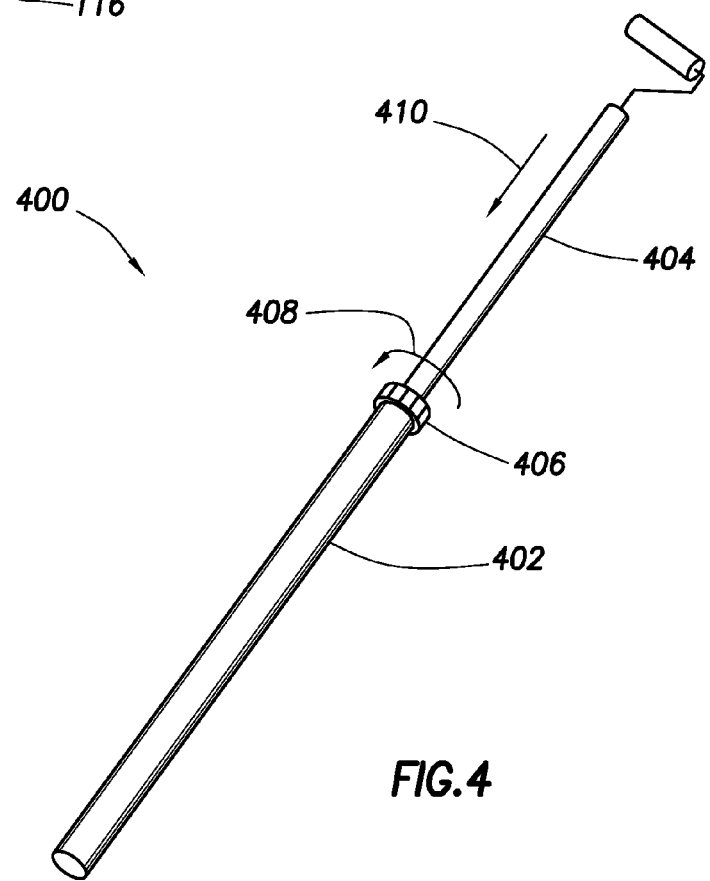
FIG. 4 shows a perspective view of a utility pole.

FIG. 4 shows a utility pole 400 in a vertical orientation. The utility pole 400 comprises a proximal pole portion 402 and a distal pole portion 404 telescoped within the proximal pole portion 402. The utility pole 400 in FIG. 4 also comprises a single external locking system 406. A shortcoming associated with the utility pole 400 having only a single external locking system 406 is that, in the vertical orientation, releasing of the locking mechanism 406 by rotation (as shown by arrow 408) immediately results in the ability of the distal pole portion 404 to telescope under the force of gravity with respect to the proximal pole portion 402. Thus, if a user grasps the utility pole 400 by the proximal pole portion 402 in one hand, and releases the external locking mechanism 406 with the other hand, gravity tends to immediately pull the distal pole portion 404 into the proximal pole portion 402, as illustrated by arrow 410. Stated otherwise, in the orientation in which the utility pole 400 is most useful, it is difficult to adjust the overall length in situations where only a single external locking system 406 is used.

Figure 5:
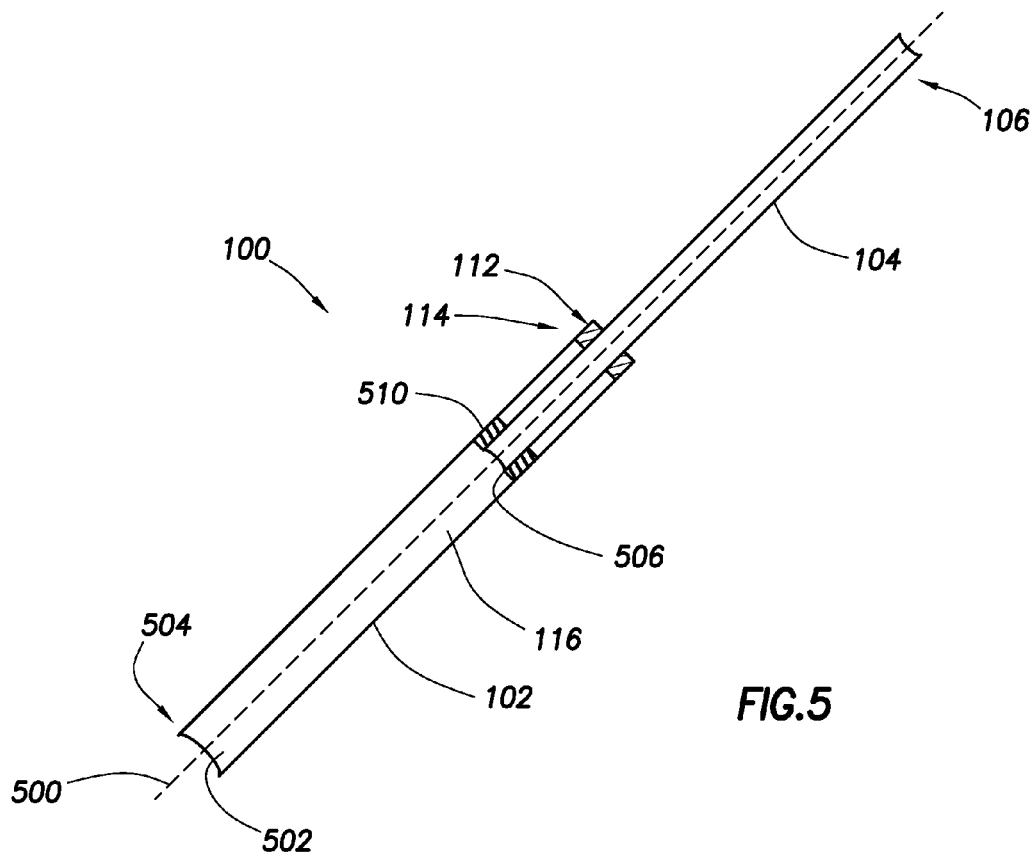
FIG. 5 shows a cross-sectional view of a utility pole in accordance with at least some embodiments.

A utility pole 100 in accordance with at least some embodiments has at least two locking systems associated with the pole. A first locking system is at least partially an external locking system, in most cases disposed at a distal end 114 of the proximal pole portion 102. The second locking system is at least partially an internal locking system disposed within the internal volume 116 of the proximal pole portion 102. FIG. 5 shows a cross-sectional view of a utility pole 100 in accordance with at least some embodiments. In particular, the utility pole 100 comprises proximal pole portion 102 and distal pole portion 104. The proximal pole portion 102 defines a central axis 500 as well as an internal diameter 502. In many cases, the proximal pole portion 102 will be griped on its proximal end 504. The distal pole portion 104 likewise defines a central axis that is coaxial with axis 500. The distal pole portion 104 again defines distal end 106, along with a proximal end 506 disposed within the internal volume 116 defined by the proximal pole portion 102.

In accordance with at least some embodiments, the utility pole 100 further comprises locking system 112 on the distal end of 114 of the proximal pole portion 102, along with a locking system 510 disposed on the proximal end 506 of the distal pole portion 104, and as illustrated disposed within the internal volume 116 of the proximal pole portion 102. The locking systems 112 and 510 will hereafter be referred to as the external locking system 112 and the internal locking system 510, but such designations shall not be read as structural limitations of the claims. As will be discussed more thoroughly below, each of the locking systems 112 and 510 have a configuration that allows the distal pole portion 104 to telescope within and without the proximal pole portion 102, thus giving the user the ability to change the length $L_P$ of the utility pole 100. Moreover, each locking system 112 and 510 has a second orientation such that the axial orientation of the proximal pole portion 102 with respect to the pole portion 104 is held in place (i.e., the length $L_P$ held constant).

In locking the relative axial orientations of the proximal pole portion 102 and distal pole portion 104, the clearances present to enable the telescoping aspects are removed. Thus, the potential shortcomings of utility poles 200 and 300, each having only a single locking mechanism, may be overcome in some embodiments. In particular, by having two locking mechanisms 112 and 510 rigidly holding the distal pole portion 104 with respect to the proximal pole portion 102, neither locking system location becomes a fulcrum for deflection, which may result in less overall deflection for the same amount of force applied with respect to utility poles 200 and 300 having only a single locking mechanism.

Moreover, having two locking systems 112 and 510 enables a user to conveniently change the length of the utility pole 100 while the pole is in the vertical orientation without the difficulty of unwanted telescoping of the distal pole portion 104 into the proximal pole portion 102 under the force of gravity as soon as the locking mechanism is released. In particular, consider the situation where both the external locking system 112 and internal locking system 510 are locked. In order to change the length of the utility pole 100 a user first unlocks the external locking system 112. However, because of the internal locking system 510, the relative axial orientation of the pole portions 102 and 104 remains unchanged. The user may then place one hand on the proximal pole portion of the 102 and the second hand on the distal pole portion 104 and change the rotational orientation of the pole portions 102 and 104 to unlock the internal locking system 510. Because the user has a hand both on the proximal and distal pole portions 102 and 104, respectively, the user can control the axial orientation reducing the likelihood that the distal pole portion 104 will telescope into the proximal pole portion 102 merely under the force of gravity. The specification now turns to a more detailed description of the external locking system 112, in accordance with at least some embodiments.

FIG. 6 shows a perspective, partial exploded, view of the external locking system 112 in accordance with at least some embodiments. In particular, the external locking system comprises a coupling member 600, a sleeve member 602, and a cam member 604. The coupling member 600 comprises an exterior surface 606, and as illustrated in FIG. 6 the exterior surface 606 defines a circular cross-section, but other cross-sectional shapes may be equivalently used. The coupling member 600 further defines an internal diameter 608, which in accordance with at least some embodiments also defines a circular cross-section. The coupling member 600, and in particular the internal diameter 608, is configured to telescope over the proximal pole portion 102 (only a portion of which is shown in FIG. 6). The proximal pole portion 102 defines a central axis 500, and the central axis defined by the internal diameter 608 is coaxial with axis 500. While in the embodiments illustrated in FIG. 6 the internal diameter 608 telescopes over the proximal pole portion 102, in other embodiments the exterior surface 606 and proximal pole portion 102 may be configured such that the exterior surface 606 telescopes within the internal diameter defined by the proximal pole portion 102. The proximal pole portion 102 and coupling member 600 of the external locking system 112 may couple using any suitable mechanism (e.g., a threaded connection, glue joint, crimping of the coupling member 600 against the proximal pole portion 102, crimping of the proximal pole portion 102 against the coupling member 600).

The external locking system 112 further comprises a sleeve member 602 coupled to the coupling member 600. In accordance with at least some embodiments, the sleeve member 602 and coupling member 600 are an integral component; while in other embodiments the sleeve member 602 and coupling member 600 may be individual components themselves coupled by any suitable mechanism (e.g., threaded connection, glue joint). The sleeve member 602 defines an internal diameter 612 that defines a cross-sectional shape substantially the same as the distal pole portion 104 that telescopes through the sleeve member 602. In accordance with at least some embodiments, the cross-sectional shape of the internal diameter 612 of the sleeve member 602 is circular. The sleeve member 602 further defines an exterior surface 614. In accordance with at least some embodiments, the cross-sectional shape of the exterior surface 614 is non-circular, and in some cases elliptical (the cross-sectional shape of the exterior surface 614 will be discussed more thoroughly below). The sleeve member 602 further comprises at least one slot 616. The slot has a long dimension parallel to the central axis 500. As will be discussed more thoroughly below, the slot 616, and in some embodiment's additional slots not visible in FIG. 6, enables the sleeve member 602 to deflect or be biased toward the central axis 500. Thus, it is relative motion between the various portions of the sleeve member 602 that the slot 616 enables, and thus the long dimension of the slot need not necessarily be parallel to the central axis 610.

Still referring to FIG. 6, the sleeve member 602 further comprises a flange member 618 that circumscribes a distal end 620 of the sleeve member 602. In accordance with at least some embodiments, when the cam member 604 is telescoped over the sleeve member 602, the flange member 618 retains the cam member 604 in operational relationship with the sleeve member 602, yet allows the cam member 604 to rotate about the central axis 500. In some embodiments, sleeve member 602 further comprises a ridge 622 on the exterior surface 614. When present, the ridge 622 works together with the shoulder 624 of the cam member 604 to act as a bearing surface.

Cam member 604 defines a first internal diameter 626, and a second internal diameter 628. In accordance with at least some embodiments, the internal diameter 626 is larger than the internal diameter 628, thus forming the shoulder 624. The cam member 604 further comprises an exterior surface 630. In accordance with at least some embodiments, the exterior surface defines semi-circular portions 632, and also defines at least one, and in some cases two, planar surfaces 634 (only one planar surface is visible in FIG. 6).

In a particular embodiment, the coupling member 600 and sleeve member 602 are constructed of a high density plastic material. The integral coupling member 600 and sleeve member 602 may be created by a casting method. In other embodiments, however, particularly embodiments where the external locking assembly 112 will be subject to high stress or impact loads, the coupling member 600 and sleeve member 602 may be metallic. In a particular embodiment, the length of the combined coupling member 600 and sleeve member 602 (the length labeled $L_c$ in the drawings) may be four centimeters (cm), but longer and shorter lengths may be equivalently used. The internal diameter 608 of the coupling member 600 is based on the external diameter of the proximal pole portion 102. For example, when the outside diameter of the proximal pole portion 102 is 3.25 cm, the internal diameter of the coupling member 600 may be 3.30 cm. Likewise, when the external diameter of the proximal pole portion 102 is 2.7 cm, the internal diameter of the coupling member 600 may be 2.75 cm. Some utility poles may have multiple extension sections, and thus multiple external coupling members 112 (and multiple internal coupling members) may be used, each appropriately sized for the tubing to which the coupling member 112 couples and to the tubing that telescopes through the respective sleeve member 602. The internal diameter 612 of the sleeve member 602 (when the sleeve is in a non-biased state) may be slightly larger than the outside diameter of the distal pole portion 104 that telescopes through the sleeve member 602. For example, for a distal pole portion 104 having an outside diameter of 2.2 cm, the internal diameter 612 of the sleeve member 602 may be 2.25 cm.

The cam member 604 in accordance with at least some embodiments is metallic, and in a particular embodiment the cam member 604 is zinc. Other metallic substances may be equivalently used, for example aluminum or steel. In a particular embodiment, the basic form of the cam member 604 is cast in zinc. In cases where the cam member 604 is cast, some or all of the interior surfaces 626 and 628 may be finalized by machining the cam member 604 after it is removed from the mold. In yet still other embodiments, the entire cam member 604 may be created by a machining process. In further embodiments still, the cam member 604 may be made from any suitable material, including high density plastics. In a particular embodiment, the cam member 604 has an axial length of approximately 1.2 cm (the axial length labeled $L_{cam}$ in FIG. 6). The difference in dimension between the interior surface 626 and interior surface 628 may be approximately 1 millimeter (mm) in at least some embodiments.

Figure 7:
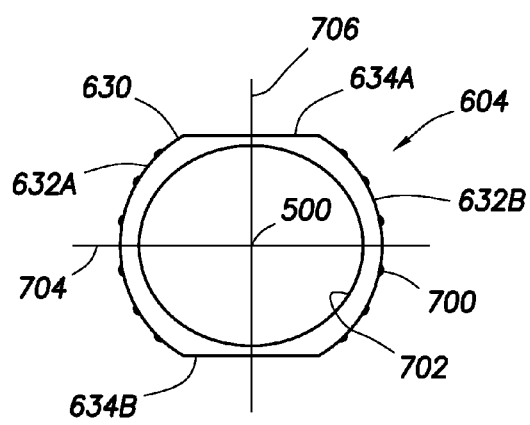
FIG. 7 shows an overhead view of cam member in accordance with at least some embodiments.

FIG. 7 shows an overhead plan view of the cam member 604 in accordance with at least some embodiments. In particular, the exterior surface 630 in at least some embodiments defines two semi-circular regions 632A and 632B. In some cases, the exterior semi-circular region 632A and 632B comprise a plurality of longitudinal ridges 700, where in some cases the longitudinal ridges are parallel to the central axis 500. The longitudinal ridges 700 are merely illustrative, and any surface irregularity which increases the ability to grasp and hold the cam member 604 may be equivalently used (e.g., longitudinal grooves, knurled surface). In accordance with at least some embodiments, the interior surface 702 (illustrative of either the interior surface 626 or interior surface 628) is non-circular. More specifically still, the interior surface 702 defines a cross-section that defines a major axis 704 and minor axis 706. The major axis 704 and minor axis 706 together define a plane, and that plane is perpendicular to the central axis 500. In the illustrative view of FIG. 7, the plane defined by the major axis 704 and minor axis 706 is parallel to the page, and the central axis 500 is perpendicular (extends out of and behind the page in FIG. 7). Thus, the cross-sectional shape defined by the interior surface 702 has an axis of symmetry along the major axis 704, and likewise has axis of symmetry around the minor axis 706. By definition, the dimension of the interior surface 702 measured along the major axis 704 is greater than the dimension of the interior surface 702 measured along the minor axis 706.

Still referring to FIG. 7, the cam member 604 in a particular embodiment comprises a first planar region 634A and second planar region 634B. The first planar region 634 defines a plane, and the second planar region 634B also defines a plane. In a particular embodiment, the planes defined by the respective regions 634A and 634B are parallel, and are also perpendicular to the minor axis 706.

Figure 8:
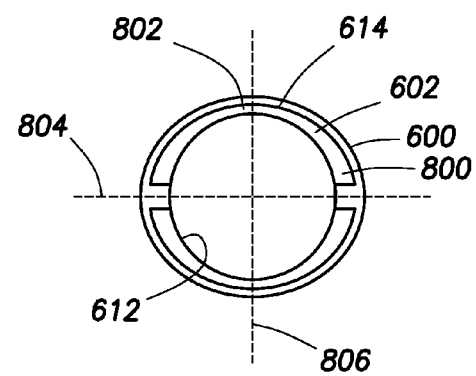
FIG. 8 shows an overhead view of a sleeve and coupling member in accordance with at least some embodiments.

FIG. 8 shows an overhead plan view of the sleeve member 602 (with the flange 618 removed), and also visible in FIG. 8 is a portion of the coupling member 600. In particular, the sleeve member 602 defines an internal diameter 612 of cross-section that matches the outside diameter of the distal pole portion 104. The sleeve member 602 further defines an exterior surface 614. In accordance with at least some embodiments, the exterior surface 614 is non-circular, and as illustrated, the exterior surface 614 is elliptical thus defining a major axis 804 and a minor axis 806. The illustrative elliptical exterior surface 614 results in differences in wall thickness of the sleeve member 602. For example, the wall thickness at location 800 of the sleeve member 602 is greater than the wall thickness at location 802.

Figure 9:
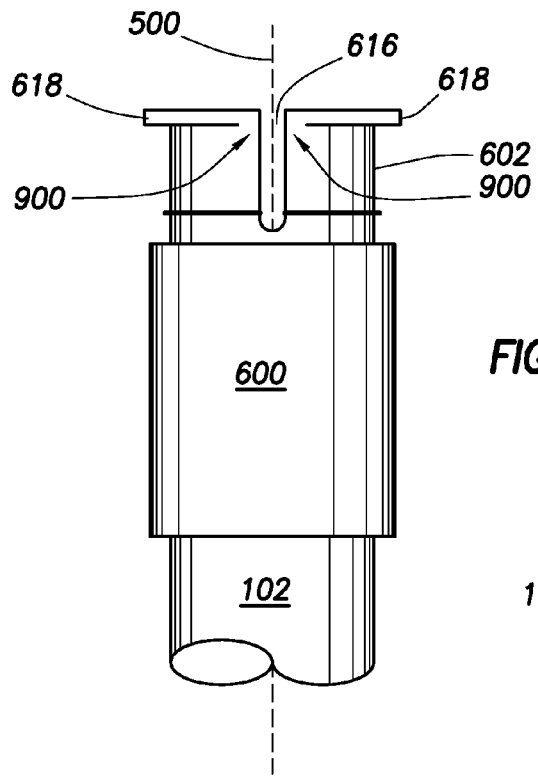
FIG. 9 shows a side elevation view of a sleeve and coupling member in accordance with at least some embodiments.

FIG. 9 shows an elevation view of the sleeve and coupling members in accordance a particular embodiment. In particular, FIG. 9 shows the coupling member 600 telescoped over the proximal pole portion 102. Also shown in FIG. 9 is the sleeve member 602 and the slot 616. The illustrative parallel alignment of the long dimension of the slot 616 with the central axis 500 is also shown. Furthermore, the flange 618 is shown. In some embodiments, the additional thickness of the exterior surface 614 to produce the illustrative elliptical shape results in the thickness obviate the presence of the flange 618 near the major axis, as illustrated by the disappearance of the flange 618 near the slot 616, at locations 900.

Figure 10:
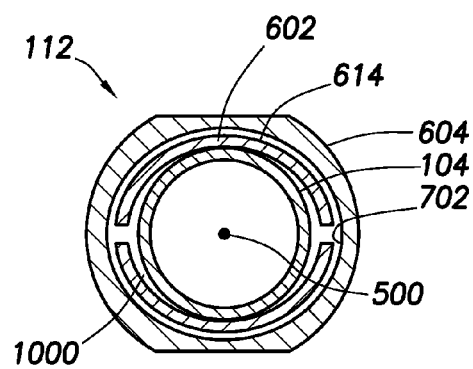
FIG. 10 shows a cross-sectional view the external locking system in accordance with at least some embodiments.

FIG. 10 shows a cross-sectional view with the cam member 604 telescoped over the sleeve member 602 (the flange portion 618 not shown), and also showing a cross-sectional view of the distal pole portion 104 telescoped through the sleeve 602. More particularly, FIG. 10 shows a first rotational orientation of the cam member 604 relative to the sleeve member 602, and in relation to the coaxial central axis 500 (perpendicular to the page). In the view of FIG. 10, the major axis of the internal surface 702 is aligned with the major axis of the exterior surface 614 of the sleeve member 602. Likewise, the minor axis of the internal surface 702 is aligned with the minor axis of the exterior surface 614 of the sleeve member 602. In the orientation illustrated by FIG. 10, the sleeve member 602 is in a non-biased orientation, providing clearance 1000 between the sleeve member 602 and the outside diameter of the distal pole portion 104. Thus, in the orientation shown in FIG. 10, the locking member 112 provides little to no impediment to changing the axial orientation of the distal pole portion 104 with respect to the proximal pole portion 102 (not shown in FIG. 10). However, in order to bias the sleeve member 602 against the exterior surface of the distal pole portion 104, the relative rotational orientations of the cam member 604 and the sleeve member 602 are changed by rotation of the cam member 604.

Figure 11:
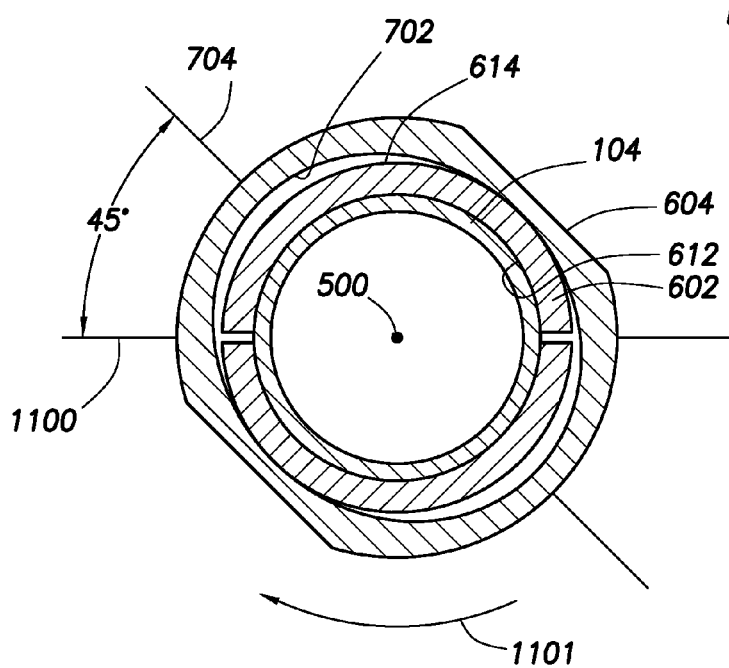
FIG. 11 shows a cross-sectional view the external locking system in accordance with at least some embodiments.

FIG. 11 shows a cross-sectional view of the cam member 604 and sleeve member 602 (with the flange 618 removed) in a second orientation of the cam member 604. In particular, the major axis 704 of the internal surface 702 of the cam member 604 is misaligned with the major axis 804 of the exterior surface 614 of the sleeve member 602. Thus, by rotation of the cam member 604 about the central axis 500 as illustrated by line 1101 the internal surface 702 of the cam biases the sleeve member 602 against the external diameter of the distal pole portion 104 (notice how the clearance 1000 of FIG. 10 is no longer present in the configuration of FIG. 11). In the orientation shown in FIG. 11 the sleeve member 602 is pressed against the distal pole portion 104 providing a friction brake, which provides a force which resists changing the relative axial orientation of the proximal pole portion 102 and distal pole portion 104. Depending on the relative sizes as between the internal surface 702 of the cam member 604 and the exterior surface 614 of the sleeve member 602, the cam member 604 may make varying amounts of angular travel relative to the central axis 500. In accordance with at least some embodiments, the amount of angular rotation of cam member 604, as between the first rotational orientation (where no locking is present) and the second rotational orientation (where locking is present), is 90 degrees or less, and as illustrated in FIG. 11 may be approximately 45 degrees.

Stated more generically then, in accordance with the various embodiments it is the misalignment of non-circular surfaces as between the interior surface of the cam member 604 and the exterior surface of sleeve 602 that biases the sleeve 602 against the outside diameter of the distal pole portion 104. In the biased configuration, the sleeve acts as a friction brake against the outside diameter of the distal pole portion 104, which thus provides a force that resists changing the relative axial orientation of the proximal pole portion 104 and the distal pole portion 102. While the various embodiments describe the cross-sectional shapes of the interior surface of the cam member 604 and the exterior surface of the sleeve 602 as elliptical, other non-circular shapes may be equivalently used. Moreover, a substantially elliptical surface may be created by a plurality of planar surfaces (e.g., ten or more such planar surfaces), particularly considering that any circular elliptical or oval surface may be mathematically considered to arise in the limit as the number of such planar surfaces increases, and the planar distance defined by each such surface decreases.

Figure 12:
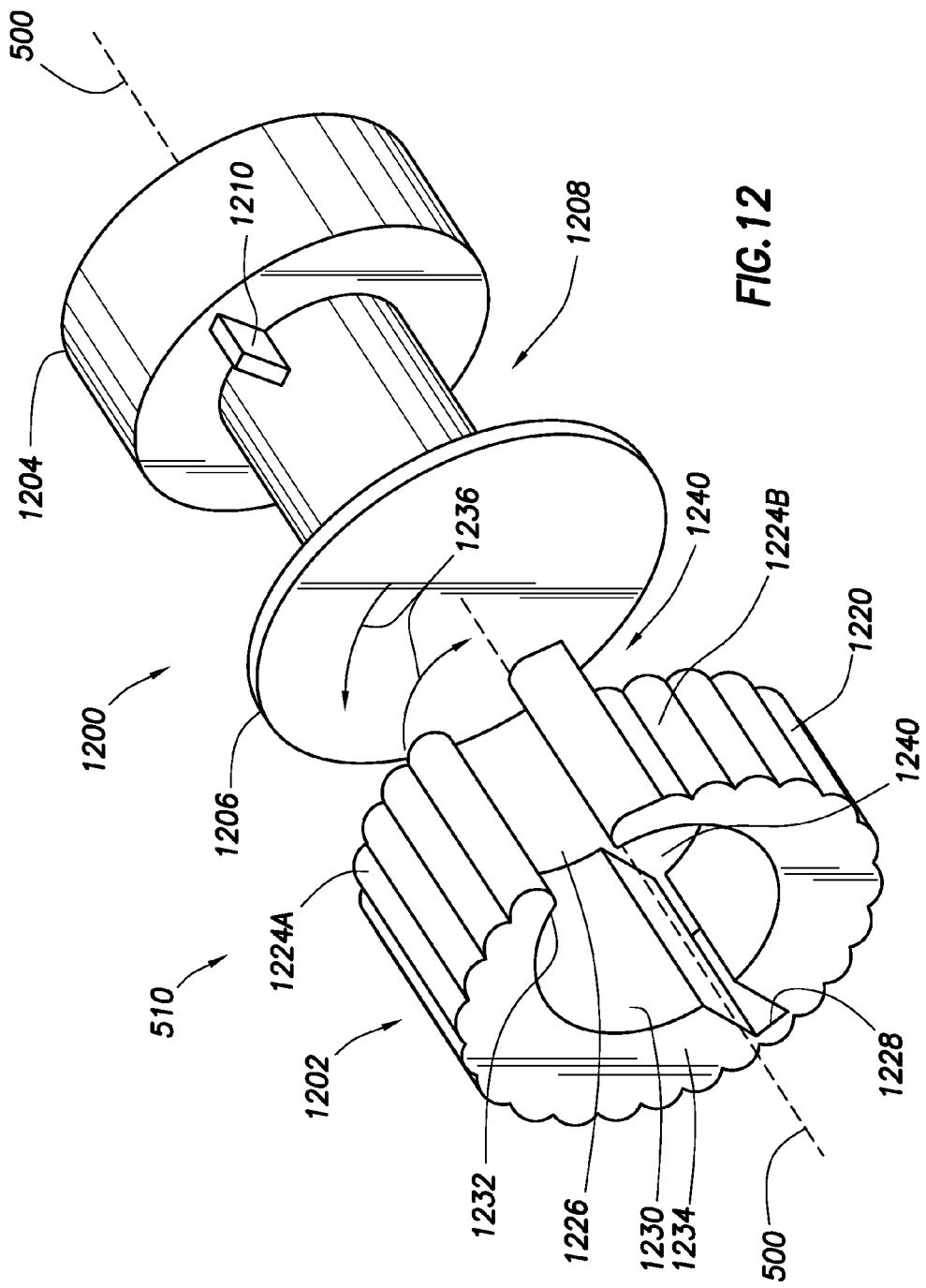
FIG. 12 shows a perspective exploded view of the internal locking system in accordance with at least some embodiments.

In accordance with the various embodiments, the utility pole 100 further comprises an internal locking system 510. The internal locking system 510 may take any of a variety of suitable forms and the illustrative embodiments of FIG. 12, shows one such form. In particular, FIG. 12 shows a perspective exploded view of the illustrative internal locking system. The internal locking system 510 in accordance with a particular embodiment comprises a hub member 1200 and an expandable cam member 1202. The hub member 1200 comprises a proximal end 1204 and a distal end 1206. The proximal end 1204 couples to a proximal end 605 of the distal pole portion 104 (not shown in FIG. 12). The hub member 1200 further comprises an annular channel 1208 within which the expandable cam 1202 resides, but in the illustrative embodiment of FIG. 12 the expandable cam member 1202 is shown outside the annular groove 1208 for purposes of explanation. Within the annular groove 1208 resides a tab member 1210 that works in conjunction with portions of the expandable cam member 1202 to expand the cam 1202 (discussed more below). The outside diameter of the hub member 1200 is smaller than the inside diameter of the proximal pole portion 102 such that the hub member 1200 may telescope axially within the proximal pole portion 102. In particular, the hub member 1200 defines a central axis, coaxial with the central axis 500 of the proximal pole portion 102 and the distal pole portion 104.

The expandable cam member 1202 comprises an outside surface 1220. In the expanded configuration, the outside surface 1220 contacts the inside diameter of the proximal pole portion 102. In a particular embodiment, the expandable cam member 1202 comprises a plurality of longitudinal ridges 1224, but in other embodiments the exterior surface 1220 of the expandable cam member 1202 may have longitudinal grooves, or the outside surface 1220 may be smooth. The expandable cam member 1202 further defines a channel 1226 such that the expandable cam member 1202 does not completely circumscribe the central axis 500. Moreover, the expandable cam member 1202 comprises a hinge portion 1228, that works in conjunction with the slot portion 1226 such that the expandable cam member can expand to contact the internal diameter of the proximal pole portion 104, and likewise can contract such that the distal pole portion 104 may telescope with respect to the proximal pole portion 102. In the illustrative embodiments of FIG. 12, the hinge portion 1228 is created by a reduced thickness portion of the material that makes up the expandable cam member 1202; however, any suitable hinge mechanism as between the illustrative two halves of the expandable cam member 1202 may be equivalently used.

Still referring to FIG. 12, the expandable cam member 1202 further defines an interior surface 1230. The exterior surface 1220 considered with the interior surface 1230 define an increasing radial thickness (with respect to the central axis 500) from the upper portion 1232 towards the lower portion 1234. In accordance with the illustrative embodiments, the interior surface 1230 works in conjunction with the tab 1210 to expand the cam member 1202. In particular, as the relative rotational orientations of the hub member 1200 and expandable cam member change as illustrated by arrows 1236, the tab member 1210 works in conjunction with the interior surface 1230 to expand or open the cam member 1202 about the hinge 1228. By expanding the cam member 1202, the exterior surface 1220 contacts and forms a friction brake against the inside diameter of the proximal pole portion 102, thus holding the relative axial orientations of the proximal pole portion 102 and the distal pole portion 104. Thus, the tab 1210 in contact with the interior surface 1230 represents a first orientation or first configuration that holds the axial orientation. A second configuration of the internal locking system 510 involves changing the rotational orientation of the hub member 1200 and expandable cam member 1202 in a fashion opposite of that illustrated by arrows 1236 such that the tab member 1210 resides within the slot area 1240 defined by the expandable cam member 1202. Other locking systems that reside at least partially within the internal diameter of the proximal pole portion, and which act to hold the relative axial orientation of the proximal pole portion with respect to the distal pole portion 104, may be equivalently used.

Figure 13:
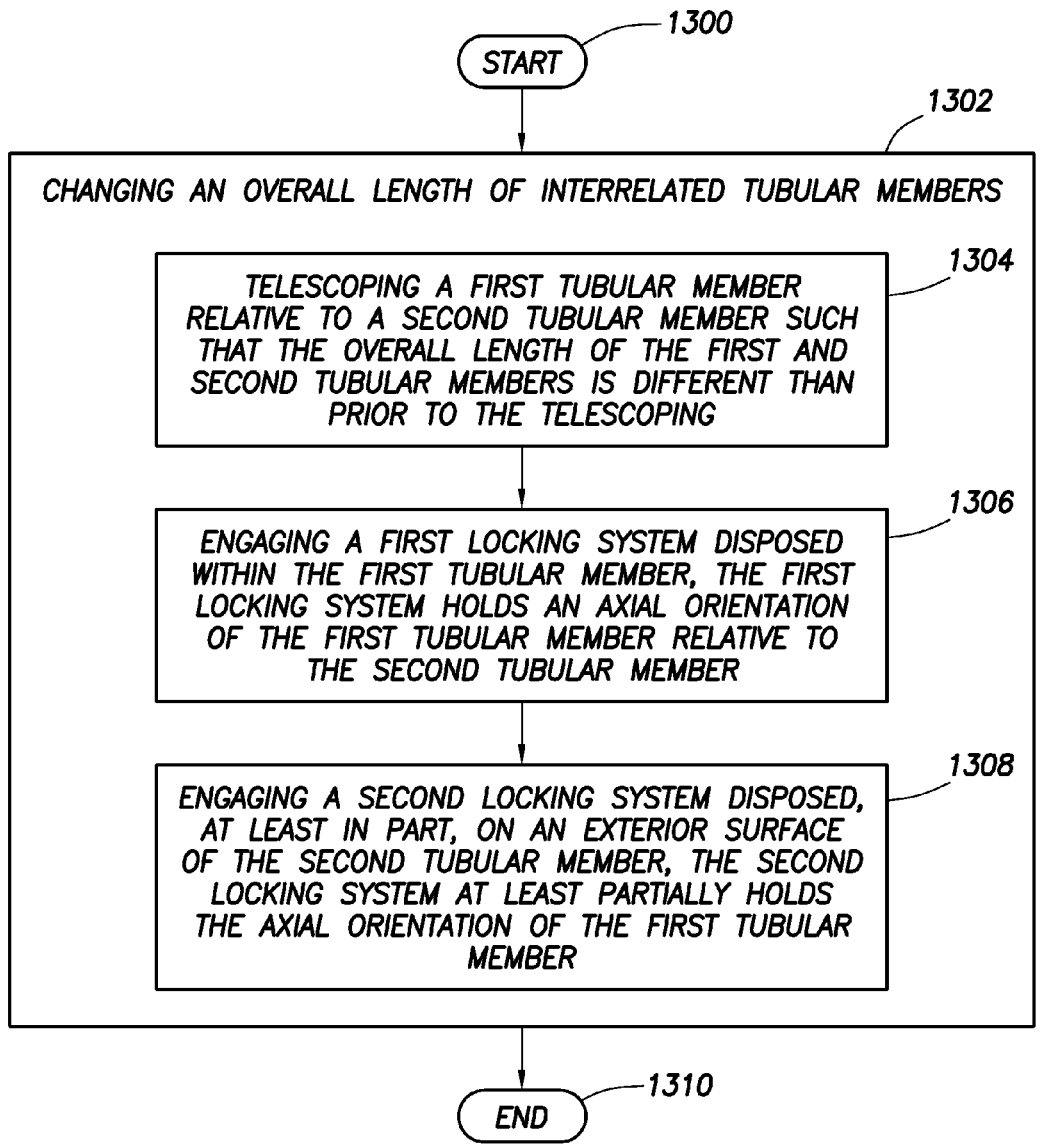
FIG. 13 shows a method in accordance with at least some embodiments.

FIG. 13 shows a method in accordance with at least some embodiments. In particular, the method starts (block 1300) and comprises changing an overall length of interrelated tubular members (block 1302). Changing the overall length of interrelated tubular members may comprise: telescoping a first tubular member relative to a second tubular member such that the overall length of the first and second tubular members is different than prior to the telescoping (block 1304); and then engaging a first locking system disposed within the first tubular member, the first locking system holds an axial orientation of the first tubular member relative to the second tubular member (block 1306); and engaging a second locking system disposed, at least in part, on an exterior surface of the second tubular member, the second locking system at least partially holds the axial orientation of the first tubular member (block 1308). Thereafter the method ends (block 1310).

The above discussion is meant to be illustrative of the principles and various embodiments of the present invention. Numerous variations and modifications will become apparent to those skilled in the art once the above disclosure is fully appreciated. For example, though referred to as an internal locking system and external locking system so as not to unduly complicate the description, the naming should not be construed as a structural limitation. Portions of the internal locking system may extend outside the internal diameter of the proximal pole portion. Likewise, portion of the external locking system may extend within the internal diameter of the proximal and/or distal pole portions. It is intended that the following claims be interpreted to embrace all such variations and modifications. Further still, the ability, or inability, of a particular device to address the shortcomings of the related-art noted above shall not be a consideration in determining whether infringement exists. A device may infringe the appended claims, and yet still not address or fully address any recited shortcoming of the related art.

What is claimed is:

1. A system comprising:
a first tubular member that defines an internal volume;

a second tubular member telescoped within the first tubular member;
a first locking system disposed within the internal volume of the first tubular member, the first locking system has first configuration that holds the axial orientation of the second tubular member relative to the first tubular member, and a second configuration in which the first locking system allows the axial orientation of the second tubular member relative to the first tubular member to change;
a second locking system distinct from the first locking system, the second locking system disposed on an outside diameter of the second tubular member at a distal end of the first tubular member, the second locking system comprising:
a sleeve that defines an internal diameter of circular cross-section through which the second tubular member extends, an exterior surface that defines a cross-section with a major axis and a minor axis, and a first slot;
a cam that defines an internal surface of cross-section that defines a major axis and a minor axis, and an exterior surface, the cam in an operational relationship with the sleeve such that the internal surface of the cam circumscribes the exterior surface of the sleeve;
wherein the cam has a first rotational orientation relative to the sleeve where the internal surface of the cam biases the sleeve against the second tubular member; and
wherein the cam has a second rotational orientation relative to the sleeve where the sleeve is non-biased and the sleeve allows the axial orientation of the second tubular member relative to the first tubular member to change.

2. The system of claim 1 wherein the exterior surface of the sleeve is elliptical.

3. The system of claim 1 wherein the internal surface of the cam is elliptical.

4. The system of claim 1 wherein the first configuration of the first locking system is created by rotation in a first direction of the first tubular member relative the second tubular member, the rotation relative to a coaxial long axis of the first and second tubular members.

5. The system of claim 4 wherein the second configuration of the first locking system is created by rotation in a second direction, opposite the first direction, of the first tubular member relative the second tubular member, the rotation relative to the coaxial long axis.

6. The system of claim 1 wherein a long dimension of the first slot is parallel to a central axis of the first tubular member.

7. The system of claim 1 further comprising a second slot in the sleeve disposed opposite the first slot.

8. The system of claim 1 wherein the exterior surface of the cam further comprises:
a first planar region, the first planar region defines a first plane; and
a second planar region disposed opposite the first planar region, the second planar region defines a second plane parallel to the first plane;
wherein the minor axis of the interior surface is perpendicular to both the first and second planes.

9. The system of claim 1 wherein the first rotational orientation of the cam is less than 90 degrees of rotation from the second rotational orientation of the cam.

10. The system of claim 1 wherein the first rotational orientation of the cam is approximately 45 degrees of rotation from the second rotational orientation of the cam.

11. The system of claim 1 wherein the sleeve further comprises a proximal portion proximate the first tubular member, and a distal portion, and in the first rotational orientation of the cam, the distal portion of the internal diameter of the sleeve is deflected against the second tubular member.

12. The system of claim 1 wherein the first locking system further comprises:
a hub member coupled to a proximal end of the second tubular member, the hub member disposed within the internal volume of the first tubular member;
a cam member in operational relationship to the hub member, the cam member also disposed within the internal volume of the first tubular member;
wherein in the first configuration of the first locking system the cam member is biased against an inside diameter of the first tubular member, and in the second configuration of the first locking system cam member is in a non-biased configuration.

13. The system of claim 12:
wherein the hub member defines an annular channel comprising a outwardly extending tab member;
wherein the cam member is disposed within the annular channel, and the cam member defines an interior surface in operational relationship to the tab member;
wherein in the first configuration of the first locking system the tab member biases the cam member against an inside diameter of the first tubular member.

14. The system of claim 1 further comprising a distance between the first locking system and the second system is different for different relative telescopic relationships of the first and second tubular members, the distance measured axially along a coaxial central axis of the first and second tubular members.

15. An extension pole comprising:
a first tubular member that defines an internal volume and a central axis;
a second tubular member that defines a central axis, the second tubular member telescoped within the first tubular member such that the central axis of the second tubular member is coaxial with the central axis of the first tubular member, and a telescopic relationship of the first and second tubular members defines a length of the extension pole;
a first locking system disposed within the internal volume of the first tubular member, the first locking system comprising:
a hub member disposed at a proximal end of the second tubular member, the hub member disposed within the internal volume of the first tubular member; and
a cam member in operational relationship to the hub member, the cam member also disposed within the internal volume of the first tubular member;
wherein in a first configuration of the first locking system the cam member is biased against an inside diameter of the first tubular member such that the first locking system holds the telescopic relationship of the second tubular member relative to the first tubular member, and in a second configuration of the first locking system cam member is in a non-biased configuration in which the first locking system allows the telescopic orientation of the second tubular member relative to the first tubular member to change; and
wherein the first configuration of the first locking system is created by rotation in a first direction of the first tubular member relative the second tubular member about the central axis of the first tubular member;

a second locking system distinct from the first locking system, the second locking system disposed on an outside diameter of the second tubular member at a distal end of the first tubular member, the second locking system comprising:
  a sleeve that defines an internal diameter of circular cross-section through which the second tubular member extends, an exterior surface that is elliptical, and a first slot;
  a cam that defines an internal surface that is elliptical, and an exterior surface, the cam in an operational relationship with the sleeve such that the internal surface of the cam circumscribes the exterior surface of the sleeve;
  wherein the cam has a first rotational orientation relative to the sleeve where the internal surface of the cam biases the sleeve against the second tubular member; and
  wherein the cam has a second rotational orientation relative to the sleeve where the sleeve is non-biased and the sleeve allows the axial orientation of the second tubular member relative to the first tubular member to change, the first rotational orientation of the cam is approximately 45 degrees of rotation from the second rotational orientation of the cam.

16. The system of claim 15 wherein the second configuration of the first locking system is created by rotation in a second direction, opposite the first direction, of the first tubular member relative the second tubular member, the rotation relative to the coaxial long axis.

* * * * *